(12) United States Patent
Leonardi et al.

(10) Patent No.: US 11,613,043 B1
(45) Date of Patent: Mar. 28, 2023

(54) STUMP GRINDER CHIP PICKUP CHUTE DEVICE AND COLLECTION SYSTEM

(71) Applicant: Leonardi Manufacturing Co., Inc., Weedsport, NY (US)

(72) Inventors: Joseph Leonardi, Auburn, NY (US); Bruce C. Jordan, Auburn, NY (US)

(73) Assignee: Leonardi Manufacturing Co., Inc., Weedsport, NY (US)

( * ) Notice: Subject to any disclaimer, the term of this patent is extended or adjusted under 35 U.S.C. 154(b) by 0 days.

(21) Appl. No.: 16/188,378

(22) Filed: Nov. 13, 2018

Related U.S. Application Data

(60) Provisional application No. 62/584,612, filed on Nov. 10, 2017.

(51) Int. Cl.
*A01G 23/06* (2006.01)
*B27L 11/00* (2006.01)

(52) U.S. Cl.
CPC .......... *B27L 11/002* (2013.01); *A01G 23/067* (2013.01); *B27L 11/005* (2013.01)

(58) Field of Classification Search
CPC ...... A01G 23/06; A01G 23/067; B02C 21/02; B27G 3/00
See application file for complete search history.

(56) References Cited

U.S. PATENT DOCUMENTS

| | | | |
|---|---|---|---|
| 4,205,468 A | 6/1980 | Charles | |
| 4,703,786 A | 11/1987 | Doskocil | |
| 5,435,359 A * | 7/1995 | Craft | A01G 23/067 144/218 |
| 6,003,570 A | 12/1999 | Falatok | |
| 8,678,052 B2 * | 3/2014 | Leonardi | B02C 21/02 144/24.12 |
| 2006/0255193 A1 * | 11/2006 | Hoekstra | A01G 23/067 241/28 |

* cited by examiner

*Primary Examiner* — Matthew Katcoff
(74) *Attorney, Agent, or Firm* — Bond, Schoeneck & King, PLLC; Frederick J. M. Price

(57) ABSTRACT

A stump grinder chip pickup chute device and collection system structured and/or configured to capture and control chips cut from a stump by a stump grinding/cutting wheel and to redirect the chips to a desired target chip collection location.

13 Claims, 19 Drawing Sheets

STUMP GRINDER CHIP PICKUP CHUTE DEVICE AND COLLECTION SYSTEM

CROSS-REFERENCE TO RELATED APPLICATION

This application claims priority to U.S. Provisional Patent Application Ser. No. 62/584,612, filed on Nov. 10, 2017 and entitled "Stump Grinder Chip Pickup Chute Device and Collection System," the entirety of which is incorporated herein by reference.

FIELD OF THE INVENTION

The present disclosure relates generally to stump grinders/cutters. More particularly, the present disclosure relates to stump grinder chip pickup chute devices and collection systems for capturing and controlling chips cut from a stump by a stump grinding/cutting wheel, and redirecting the chips to a desired target chip collection location.

BACKGROUND

Various conventional stump grinders with chip collection and removal systems exist. For example, WO 2006/050222 is directed to a stump grinder with wood waste collection and removal system. However, the disclosed embodiments of the collection and removal system of WO 2006/050222 include a large gap between the stump grinding mechanism 3 and a conveyance chute 5. See, e.g., FIGS. 1, 3, 4 and 7. Such a large gap typically only allows for partial collection of chips cut by the stump grinding mechanism, while the remainder of the cut chips and other wood and soil waste spread out and around the cut area. Moreover, such a configuration can suffer from increased plugging at the chute due to the lack of energy conserved in the chips and the sticky soil material. Stated differently, the majority of chips and other wood and soil waste cut by this stump grinder with wood waste collection and removal system (and all other similar conventional devices/systems) cannot be captured, controlled, and then redirected to a desired target chip collection location.

Accordingly, the inventor recognized that there is a need in the art for improved stump grinder chip chute devices and collection systems for capturing, controlling, and redirecting a majority of chips cut from a stump by a stump grinding/cutting wheel to a desired target chip collection location.

Description of the Related Art Section Disclaimer: To the extent that specific patents/publications/products are discussed above in this Background Section or elsewhere in this Application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Background Section and/or throughout the application, the descriptions/disclosures of which are all hereby incorporated by reference into this document in their respective entirety(ies).

SUMMARY OF THE INVENTION

The present disclosure is directed to inventive devices and systems structured and/or configured to capture, control and redirect chips cut from a stump by a stump grinding/cutting wheel to a desired target chip collection location. These devices and systems can be configured and/or structured to work with and harness the energy in chips cut from a stump by a stump grinding/cutting wheel, in order to facilitate such control and redirection.

It is a primary object and advantage of an embodiment of the present invention to contain and control the cut chips by creating a sufficient seal on the proximal end of the chip pickup chute collection system, and redirecting at least a majority (if not all) of the chips to a plurality of pickup chutes and/or a particular collection bin, collection bag, conveyor belt or other target location on the distal/discharge end of the distal most chip pickup chute. One or more of the plurality of pickup chutes (which can be made as a one piece or multiple piece construction, and from plastic, polymer, steel, or a flexible metal) can be attached to the stump grinding wheel, or to a moveable machine to which the stump grinding wheel is also attached, by a parallel linkage, sliding mechanism or other similar connection that allows movement of the pickup chutes with respect to the element to which it is attached. In brief, one or more of the plurality of pickup chutes can be moveable (e.g., left, right, up and down, in and out) with respect to the stump grinding wheel and/or to the moveable machine. Further, one or more of the plurality of pickup chutes can include a conveyor belt, sweeper/power brushes, auger, vacuum or other mechanism that can assist with the movement of chips to a desired location. The better the seal and control/direction of the cut chips, the less time a user needs to spend on cleaning up scattered chips not positioned in a target collection location (compare to the conventional systems, where many of the chips are scattered and need to be cleaned/picked up and moved to a collection location after a stump is cut/ground). In addition to minimizing clean up time, the pickup chip chute collection system of an embodiment helps maintain a clear view of the stump being cut, and can better protect the stump cutting wheel by allowing a user to avoid rocks and other hard material in the ground near the stump being cut (as opposed to conventional systems that spray cut chips right in the work area masking any such damaging material).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The details of one or more embodiments are described below and in the accompanying drawings. Other objects and advantages of the present invention will be apparent from and elucidated with reference to the embodiment(s) described hereinafter.

BRIEF DESCRIPTION OF THE DRAWINGS

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments.

Reference is now made briefly to the accompanying drawings, in which.

Figure 1A:
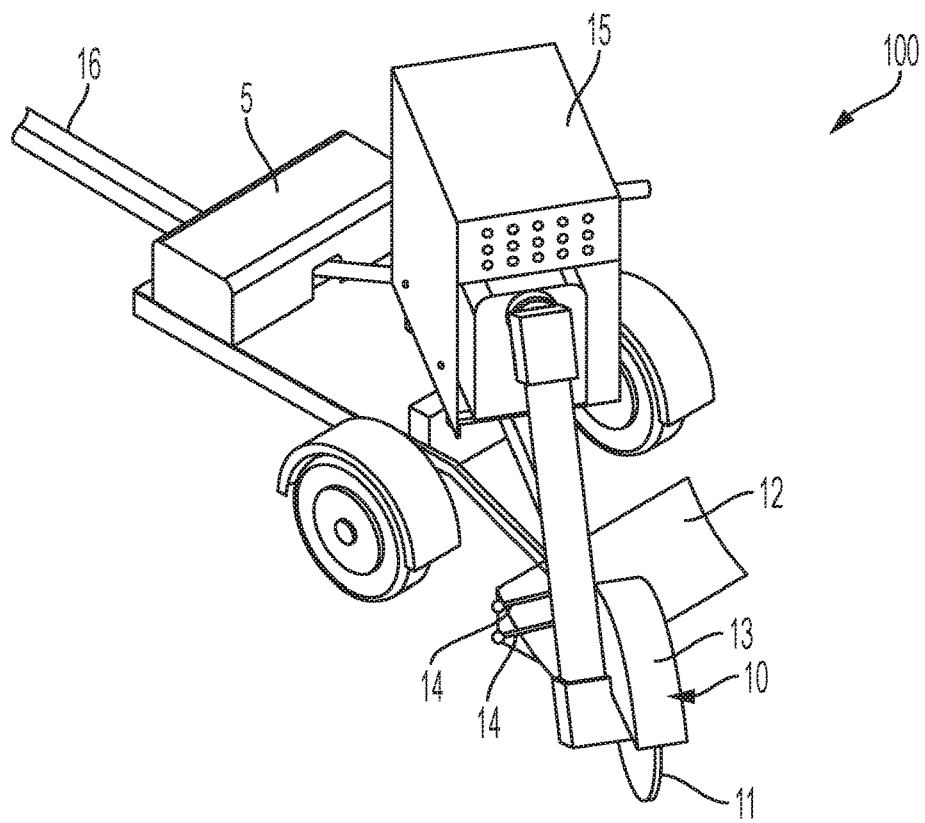
FIGS. 1A-D are various schematic representation views of a stump grinder chip pickup chute collection system according to an embodiment.
Figure 1B:
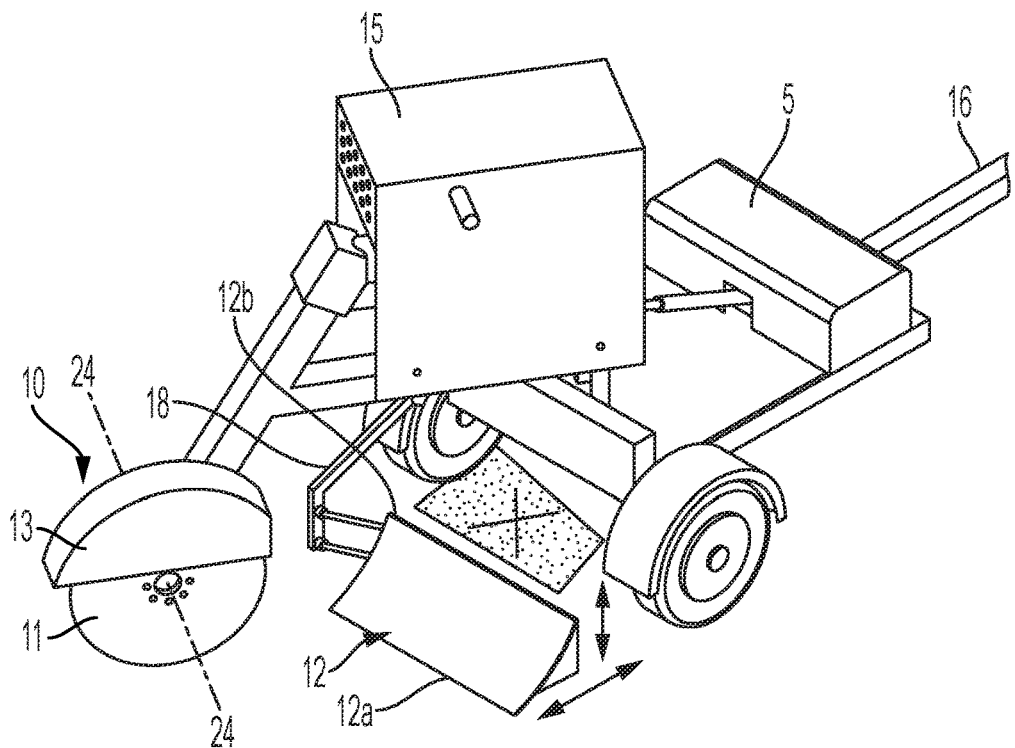
Figure 1C:
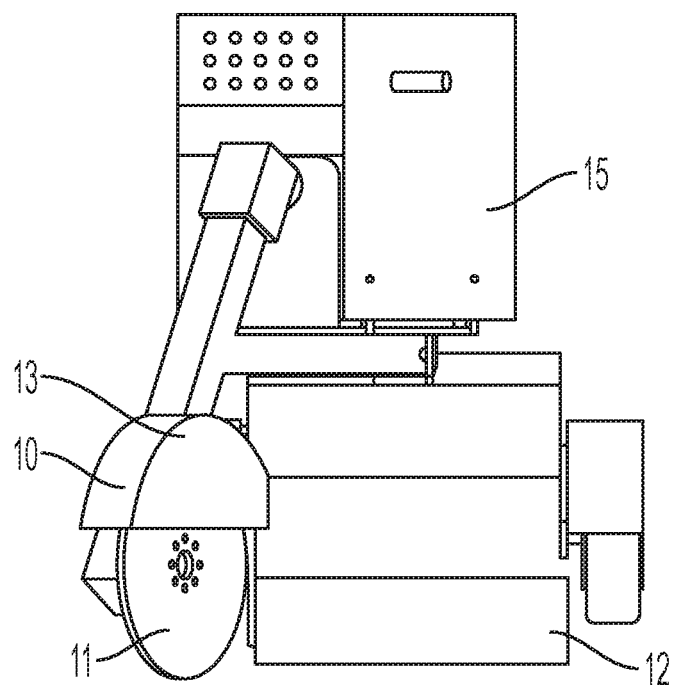
Figure 1D:
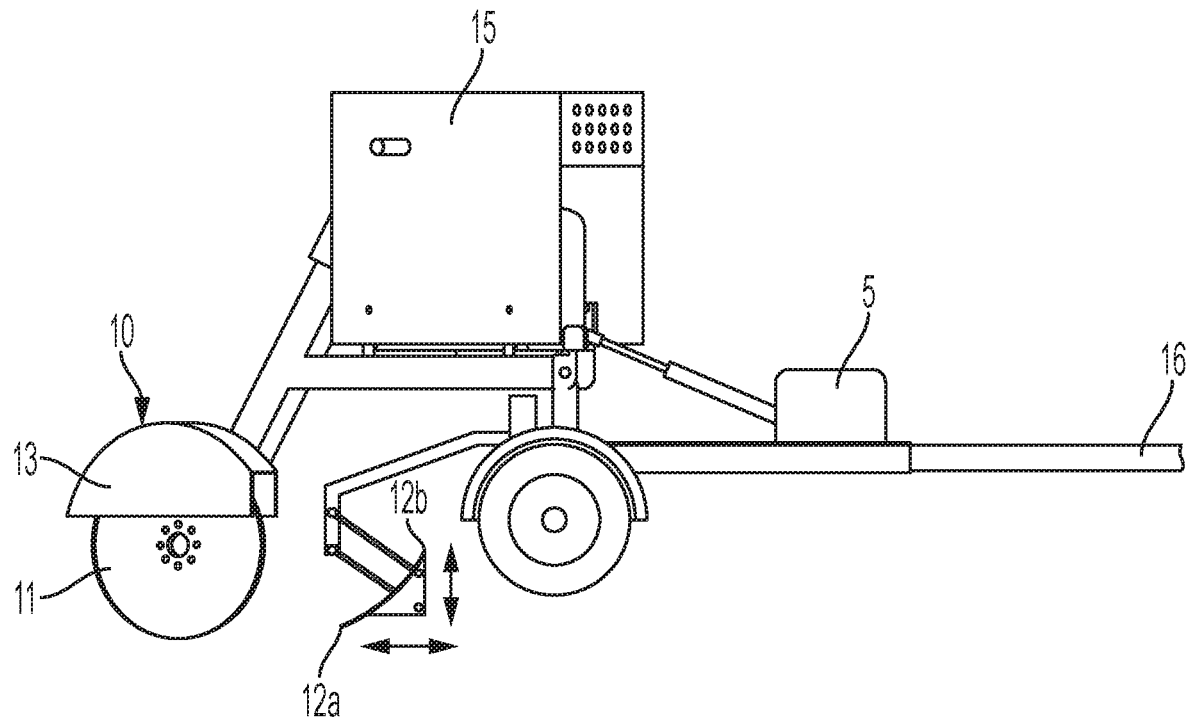

Where applicable, like reference characters designate identical or corresponding components and units throughout the several views, which are not to scale unless otherwise indicated. Moreover, the embodiments disclosed herein may include elements that appear in one or more of the several views or in combinations of the several views.

DETAILED DESCRIPTION OF EMBODIMENTS

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

As further background information helpful to understanding this detailed description, the cut material (including cut stump chips) in stump grinding starts out more wood then soil depending on how high off the ground the stump is. As stump grinding wheel moves below ground level, the cut material becomes more soil than wood. The "chip" or cut material will vary with the type and age of the tree (i.e., dry and crumbly to wet, sappy & sticky). The soil can range from desert dry and dust-like to wet, sticky clay. The shape of the wood chip portion of the cut material can be chunks a quarter of the size of a postage stamp. The wood chip could also be a foot long and 2 inches wide depending on the type of cutting tooth, machine horsepower, moisture level and type of tree. The cut material will typically travel in a straight line as it leaves the cut. The "chip" or cut material can act like a feather or to the other extreme like a rock (and can be a rock) or a baseball or an even worse combination like sticky gum. The cut material can be a combination of soil and wood. Depending on this combination of variables and the speed of the wheel, the "chip" will travel a short distance of a few inches to as much as a few hundred feet. The "chip" or cut material will travel in continued motion if a "seal" is maintained; if the seal is interrupted then re-established the "chip" can be picked up by the spinning wheel and moved again or put back into motion (as described further herein).

As should be understood with a review of this disclosure and the accompanying drawings, a chip pickup chute collection system of an embodiment of the present invention can have at least a first primary pickup chute with a proximal/first end (end positioned closest to the back end of the stump grinding wheel) that is structured and configured to capture/control/redirect chips cut by a stump grinding wheel and to harness the energy of the cut chips exiting the wheel at an initial wheel exit point. The proximal end of the first primary pickup chute is structured and configured to harness the energy of the cut chips, in part, by creating at least a partial "seal" right next to (or can be positioned close to, but not right or next to) the initial wheel exit point (which can be at least 50% and preferably above 70% of the cut chips, as should be understood by a person of ordinary skill in the art in conjunction with a review of this disclosure), redirect the cut chips (which can be at least 50% and preferably above 70% of the cut chips) toward at least one other/secondary pickup chute, and/or a particular collection bin, collection bag, conveyor belt or other target location on the distal/discharge end of the distal most chip pickup chute. Each of the pickup chutes can be moveable with respect to other parts of the system including the stump grinding wheel and/or the moveable machine, which should become clear after a review of the Figures and the related description below. Aspects described with respect to one or more embodiments below can be equally applicable to and included with other embodiments discussed below (even if not so expressly discussed).

Figure 6:
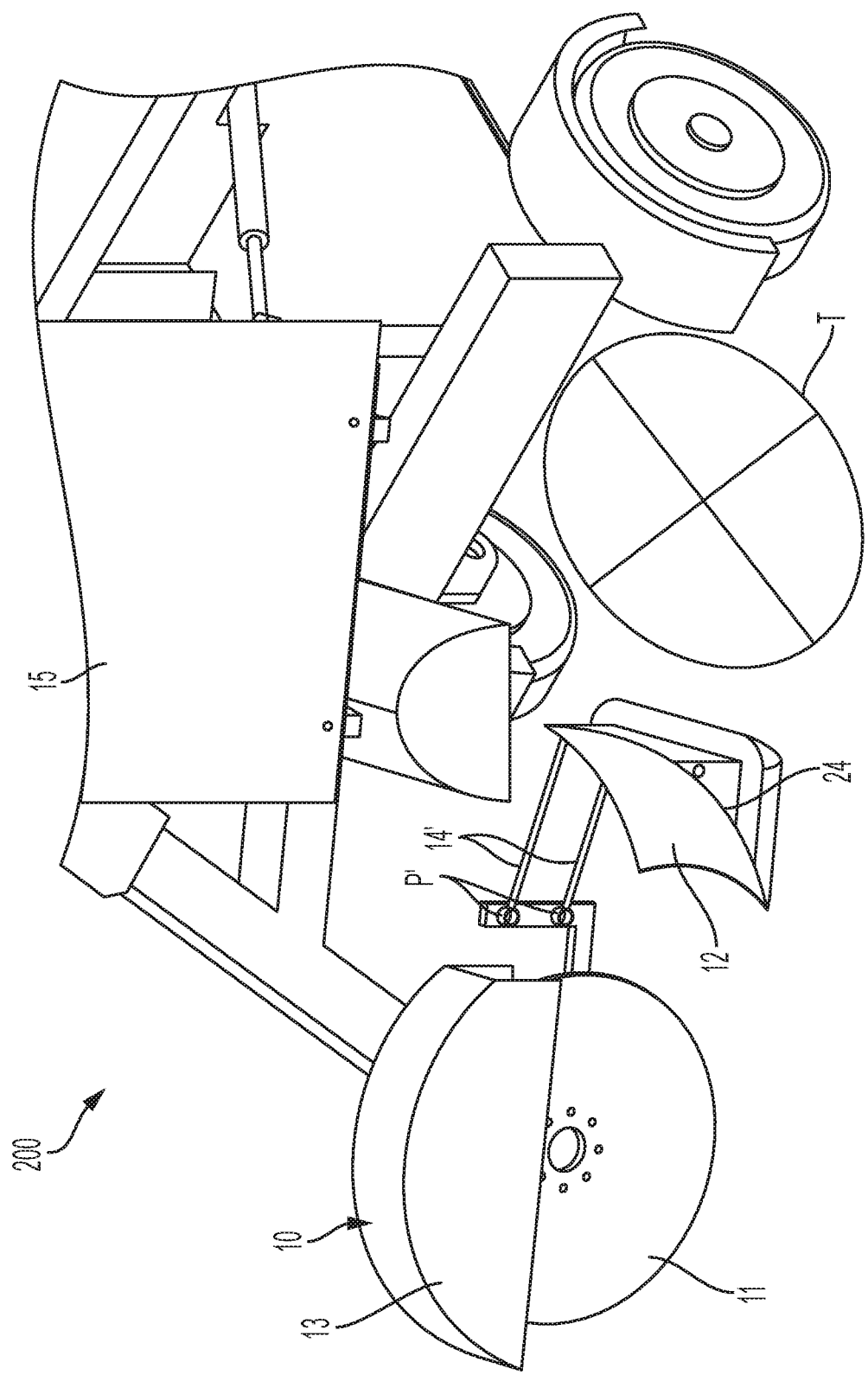
FIG. 6 is a schematic representation view of a stump grinder chip pickup chute collection system according to an embodiment.
Figure 7:
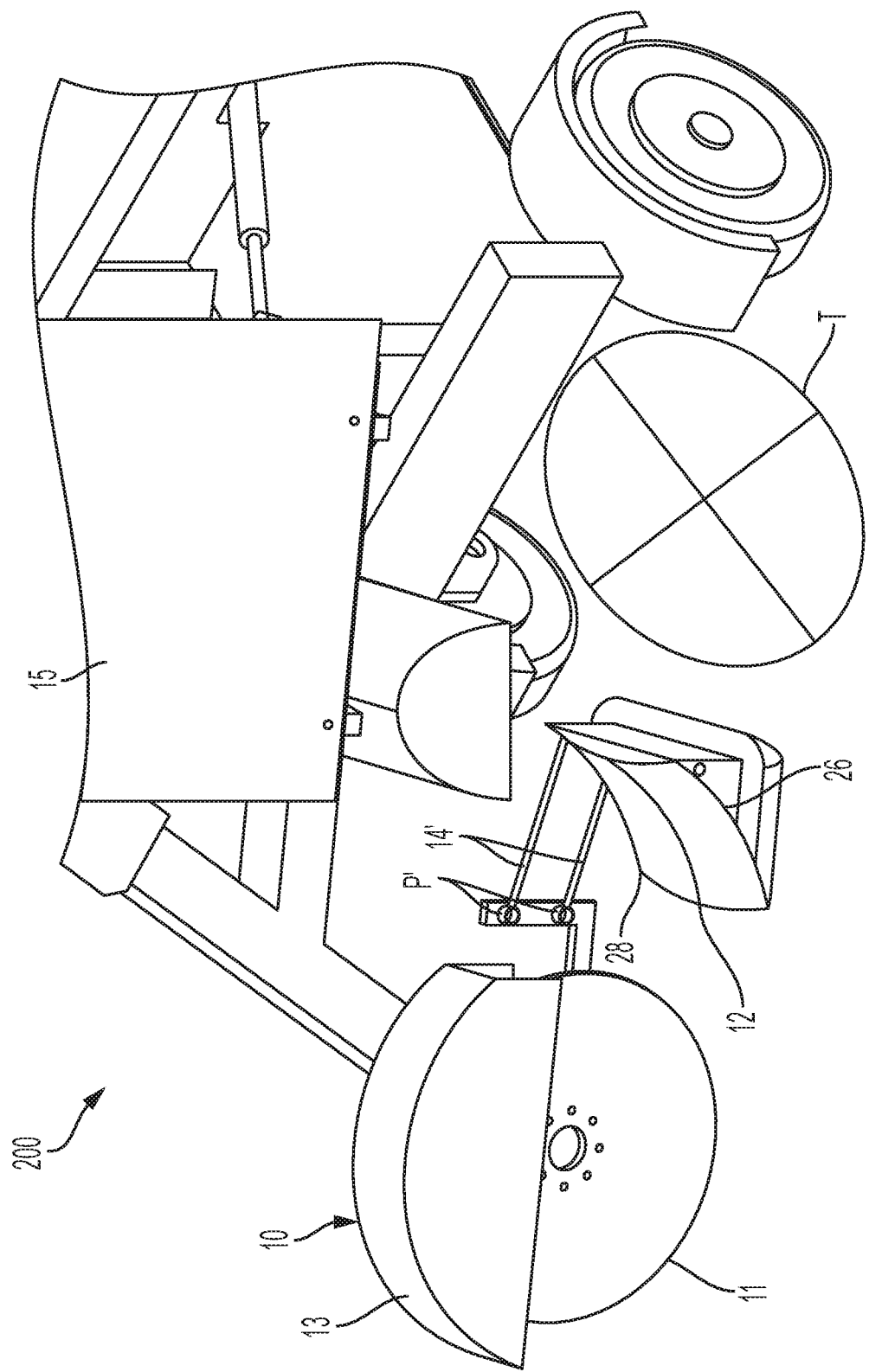
FIG. 7 is a schematic representation view of a stump grinder chip pickup chute collection system according to an embodiment.

Turning to FIGS. 1A-D, various schematic representation views of a stump grinder chip pickup chute collection system 100 are shown according to an embodiment. In particular, a stump grinding mechanism 10 with stump cutting/grinding wheel 11 and a guard or chip chute 13 is shown with a central longitudinal axis 24 (which can include any stump cutting/grinding wheel with various stump cutting tooth assemblies, as should be understood by those of skill in the art, including, for example, the stump cutting tooth assembly and stump cutting wheel (with or without a chip chute system) shown and described in U.S. Pat. Nos. 8,584,717, 6,382,277, and/or copending PCT application no. PCT/US18/58393). The stump grinding mechanism 10 is shown with a frame connected to a motor 15 and is connected to a tow behind or self-propelled, or other moveable machine 5 that can maneuver the stump grinder chip pickup chute collection system 100 and can be connected (via a hitch or other mechanism) to a truck or other vehicle at location 16, as should be understood by a person of skill in the art in conjunction with a review of this disclosure. The stump grinding mechanism 10 can be steerable with respect to the moveable machine 5. A primary chip pickup chute 12 is shown positioned behind the stump grinding mechanism 10, and is connected to the non-pivoting frame 18 of the moveable machine 5 by a parallel linkage 14 and travels with the moveable machine 5. The primary chip pickup chute 12 can also be connected to the stump grinding mechanism/assembly 10 (wheel, chute, frame etc.), and moveable with respect thereto (see, e.g., FIGS. 5-7). The primary chip pickup chute 12 includes a proximal or first end 12a and a distal or second end 12b, and can include only a bottom surface, a bottom plus side surfaces, or a bottom plus side and top surfaces. The primary chip pickup chute 12 can have radiused corners and edges 22 (see, e.g., FIG. 10) so that it does not bite and get stuck into the ground.

Figure 4:
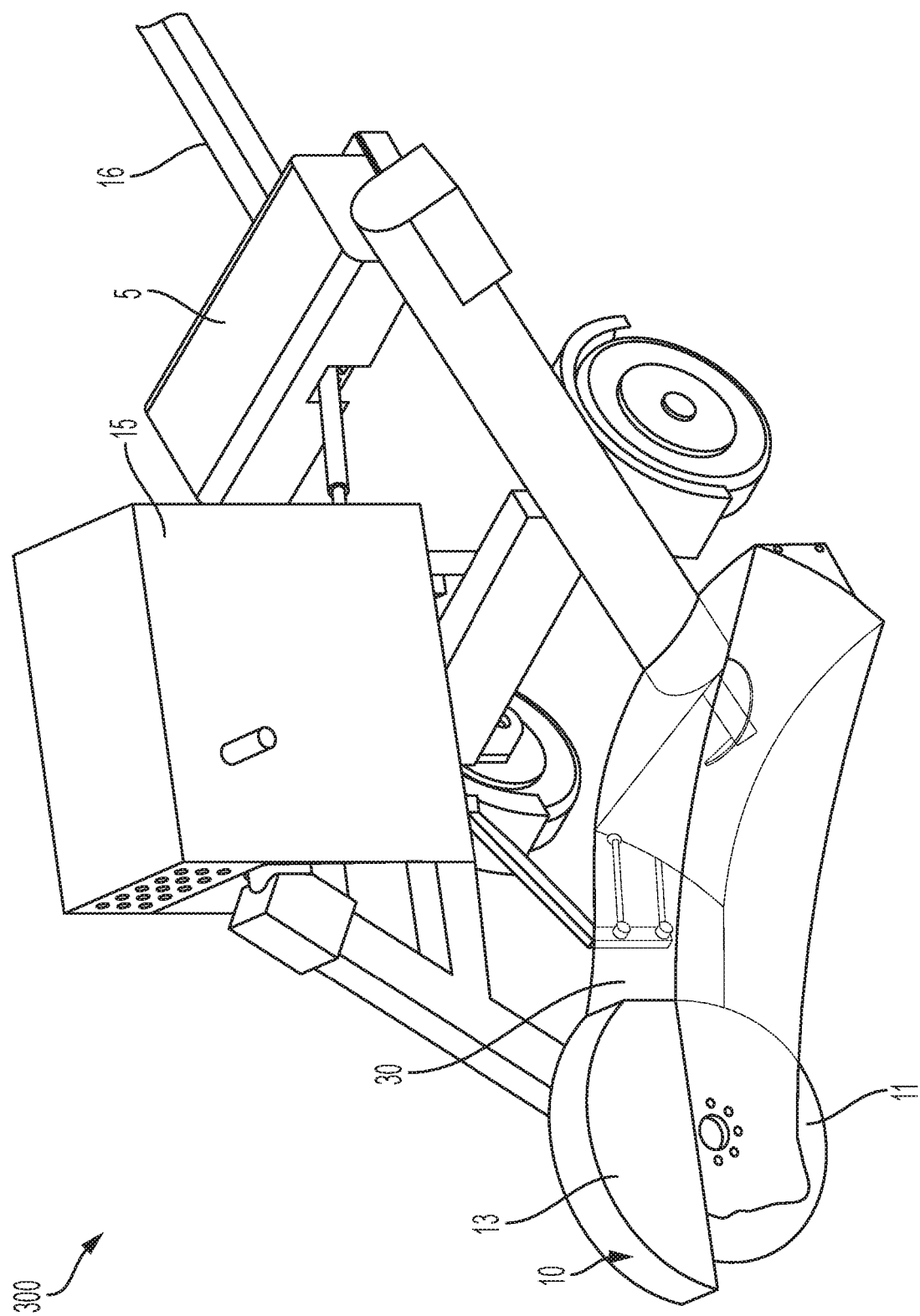
FIG. 4 is a schematic representation view of a stump grinder chip pickup chute collection system according to an embodiment.

The primary chip pickup chute 12 can move in all directions/six degrees of freedom (e.g., left, right, up, down (within a single plane positioned a predetermined distance from the longitudinal axis of the wheel when the wheel is facing forward, e.g., a first direction—see, e.g., FIG. 4), in, out, and pivot at an attachment point "P" in any direction, as should be understood by a person of skill in the art in conjunction with a review of this disclosure) and is attached at an attachment point "P" behind the stump grinding mechanism 10 via the parallel linkage 14 which can be mechanically or electromechanically operated, as should be understood by a person of skill in the art in conjunction with a review of this disclosure. For example, when in use, the proximal/receiving or first end 12a of the primary chip pickup chute 12 can be brought in close proximity to the back end of the stump cutting/grinding wheel 11 and be positioned close to the ground (and at an angle as may be necessary based on the angle/position of the stump cutting/grinding wheel 11, the ground, and/or the movable machine 5) when in use in order to create a sufficient seal and harness the energy of the chips exiting the back end of the stump cutting/grinding wheel 11 (as discussed above), and to control/redirect at least 50% or more of the cut chips from the distal/discharge/second end 12b of the primary chip pickup chute 12 to a target area "T." This target area can be another/secondary pickup chute, a particular collection bin, collection bag, conveyor belt or other target location.

Figure 2A:
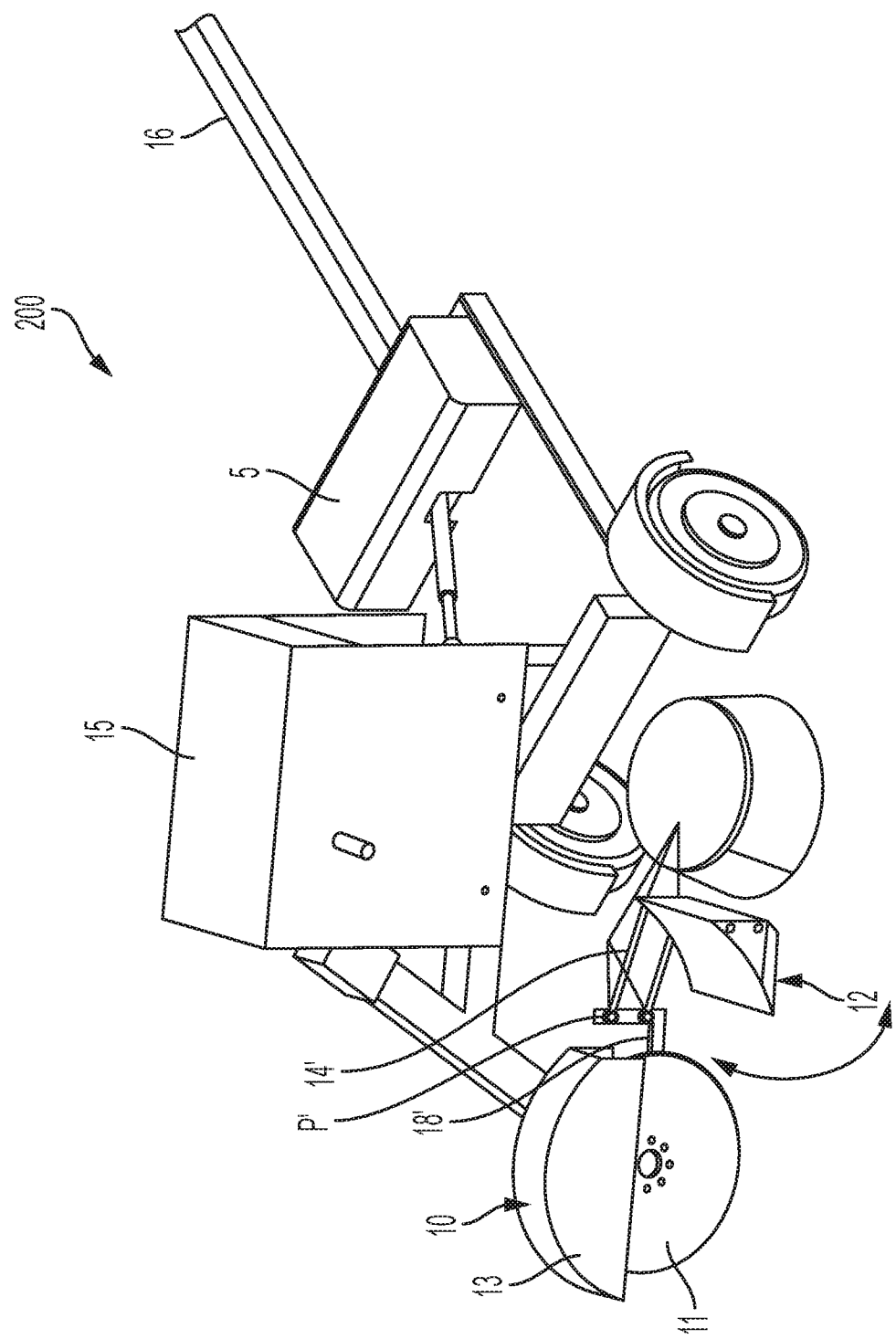
FIGS. 2A-C are various schematic representation views of a stump grinder chip pickup chute collection system according to an embodiment.
Figure 2B:
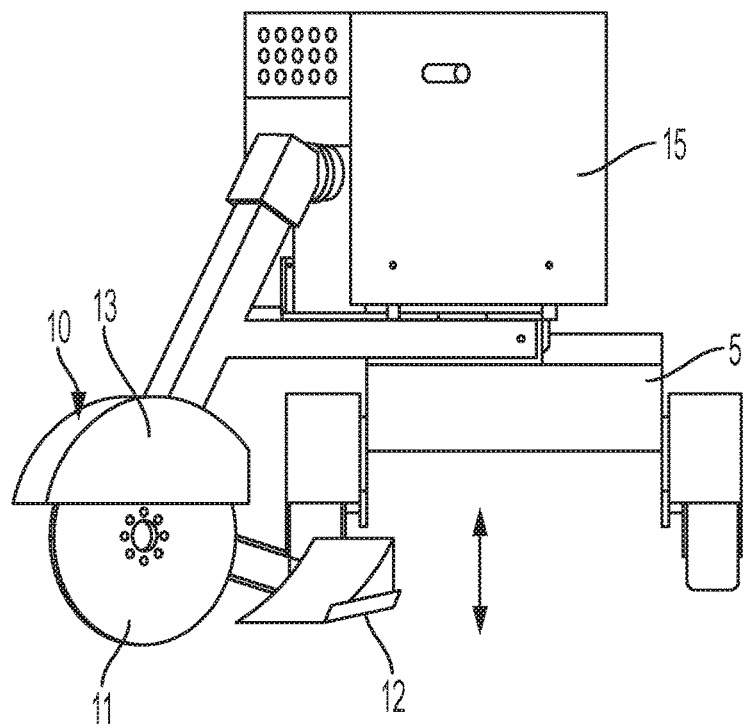
Figure 2C:
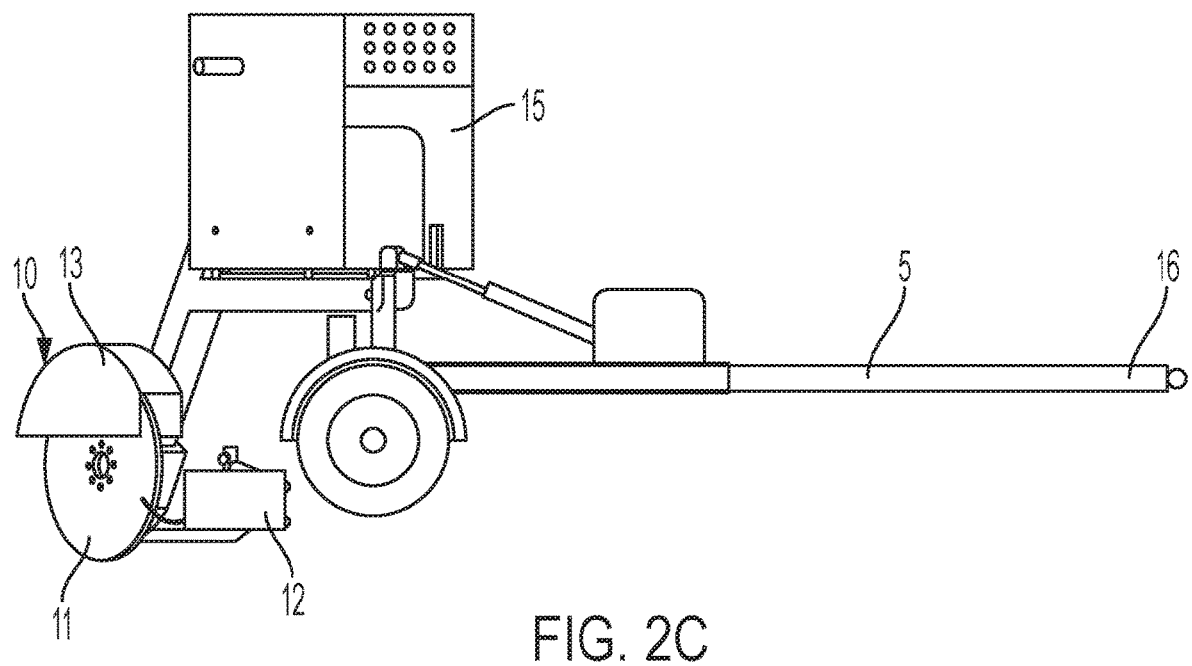

Turning to FIGS. 2A-C, various schematic representation views of a stump grinder chip pickup chute collection system 200 are shown according to an embodiment. This embodiment is similar to the embodiment described with respect to system 100 above. The basic movements and functionality of the primary chip pickup chute 12 are the same as discussed above (except with respect to connection of the primary chip pickup chute 12). A main difference includes the connection of the primary chip pickup chute 12 to the stump grinding mechanism 10 via the parallel linkage 14 (instead of to the frame 18, as discussed with respect to FIGS. 1A-D), which allows primary chip pickup chute 12 to travel with the stump grinding mechanism 10 (instead of being fixed to the frame of machine 5). This provides the primary chip pickup chute 12 with a different attachment point closer to the stump grinding mechanism 10, which can be moved closer or further away from the center of the wheel, from which it can move in all directions/six degrees of freedom (e.g., left, right, up, down, in, out).

Figure 5A:
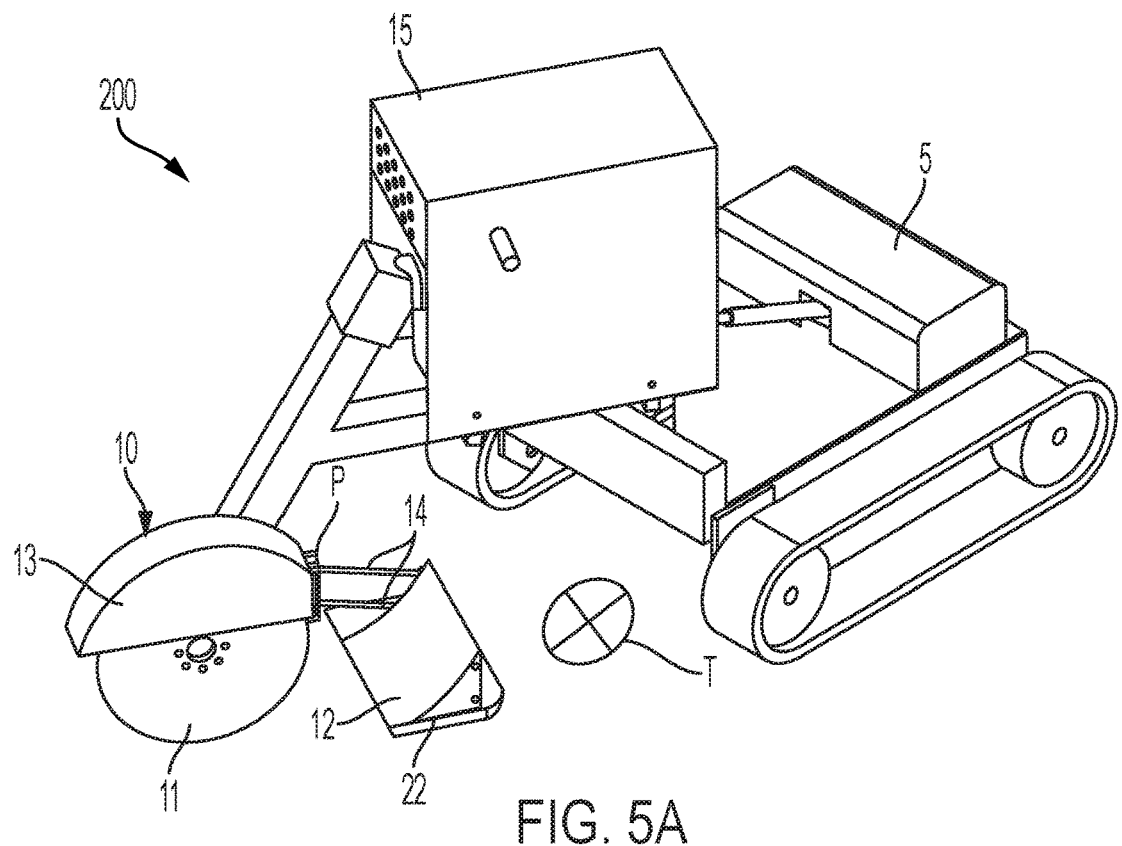
FIG. 5A-C is a schematic representation view of a stump grinder chip pickup chute collection system according to an embodiment.
Figure 5B:
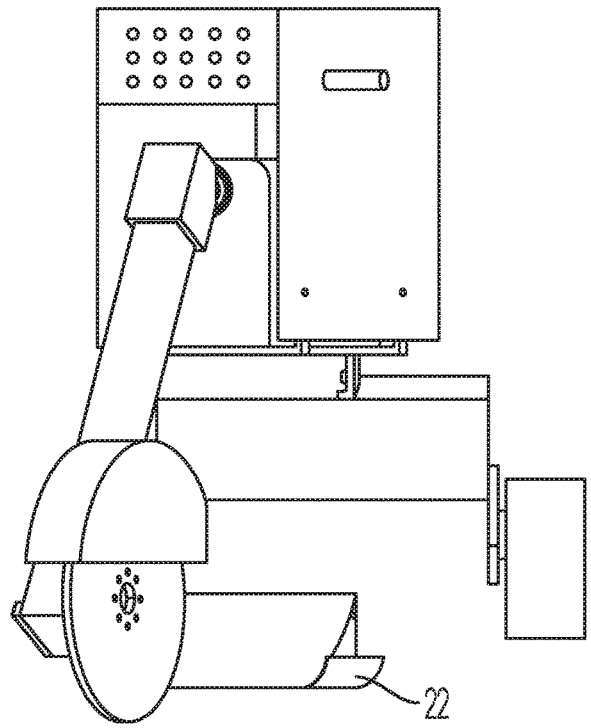
Figure 5C:
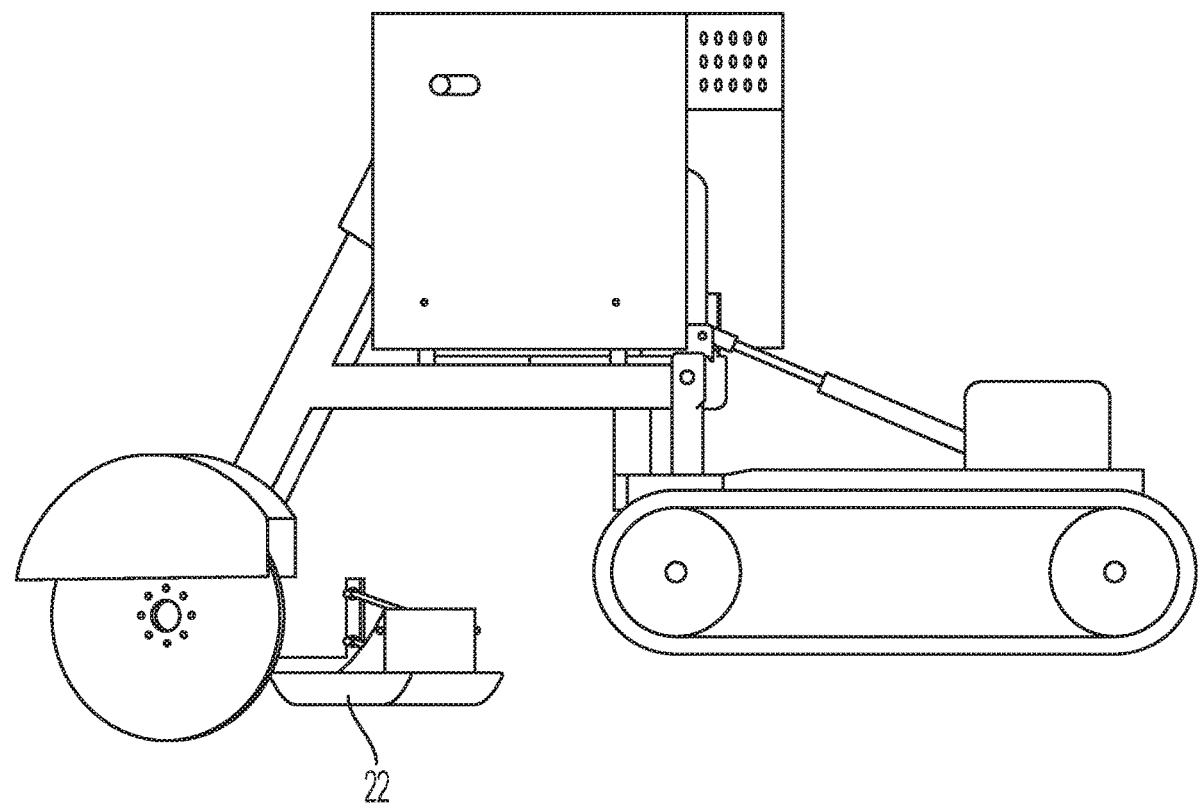
Figure 8:
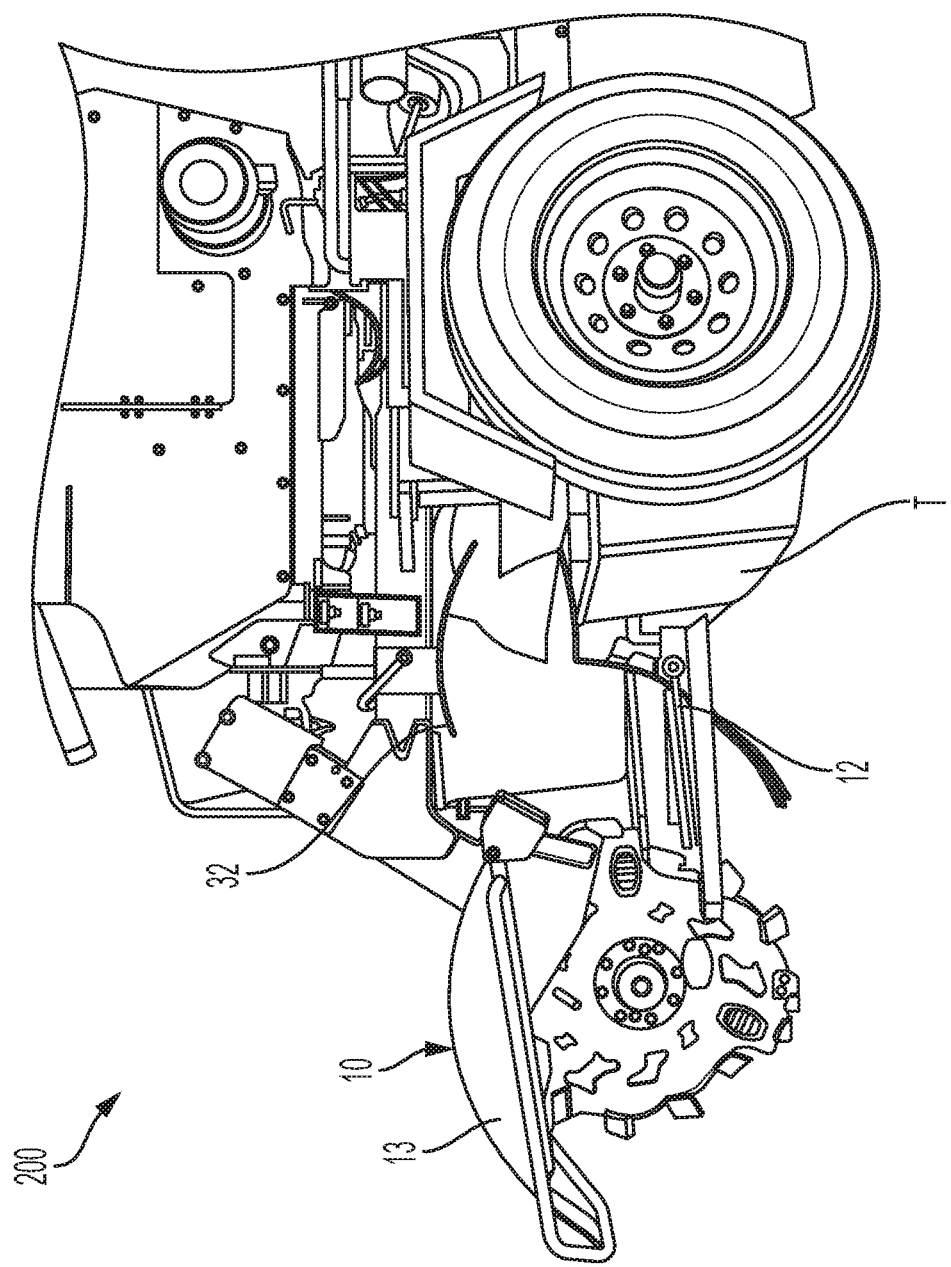
FIG. 8 is a digital photograph of a stump grinder chip pickup chute collection system according to an embodiment.
Figure 9A:
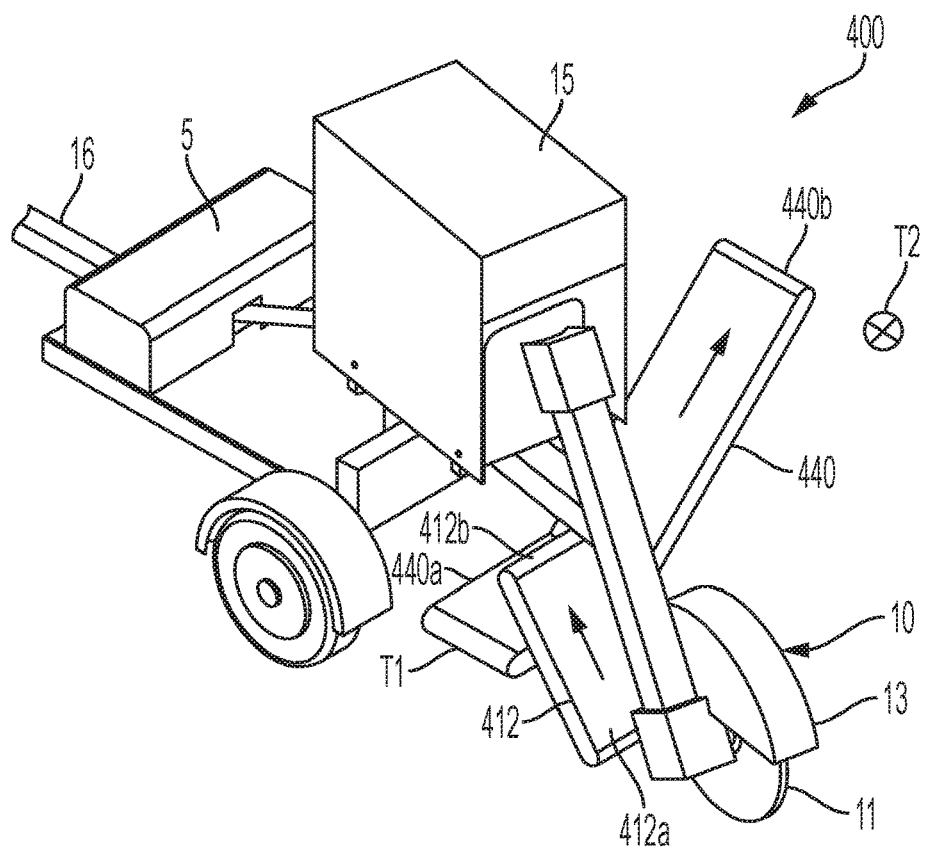
FIGS. 9A-D are various schematic representation views of a stump grinder chip pickup chute collection system according to an embodiment.
Figure 9B:
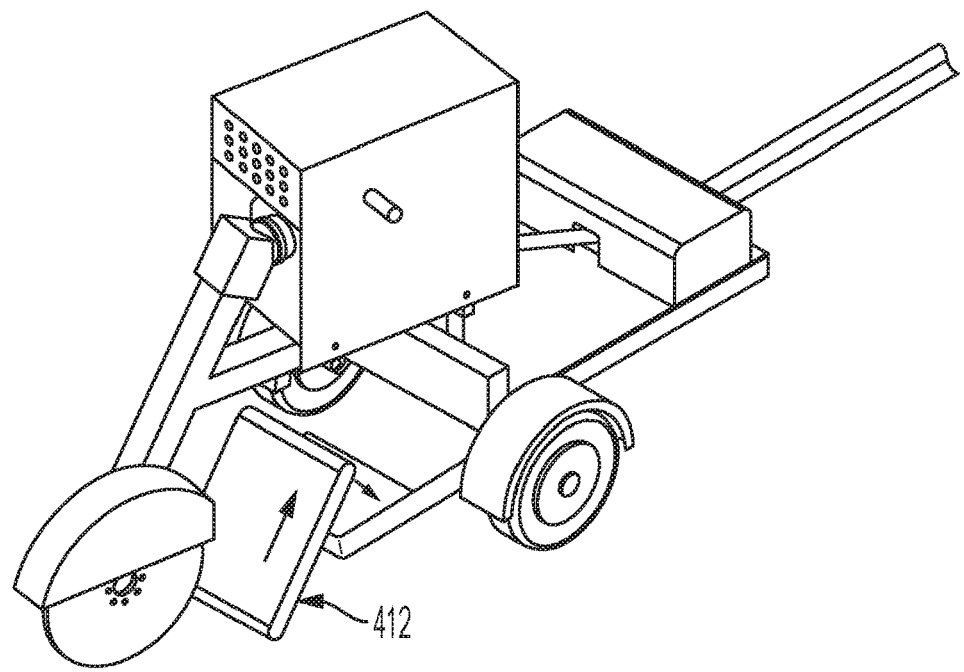
Figure 9C:
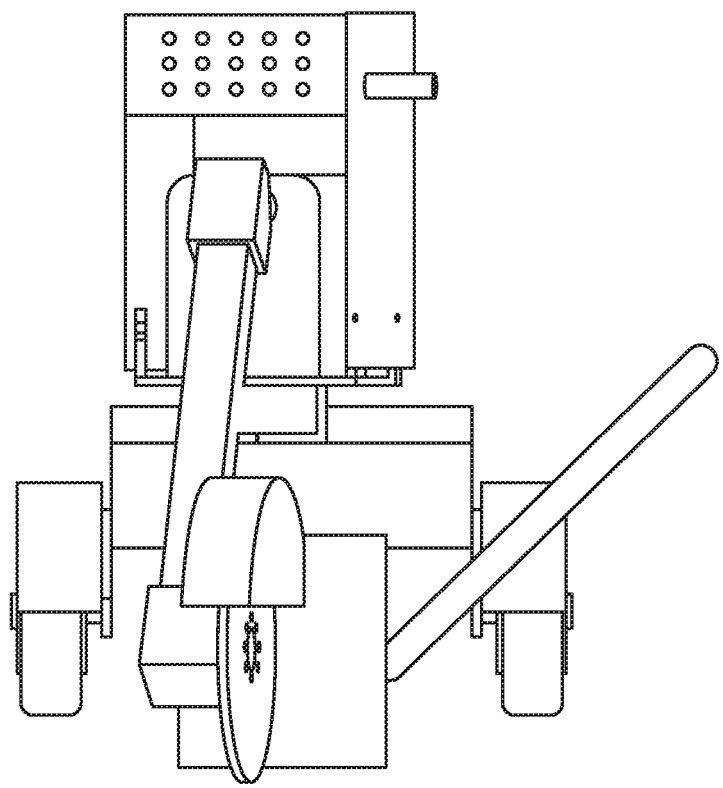
Figure 9D:
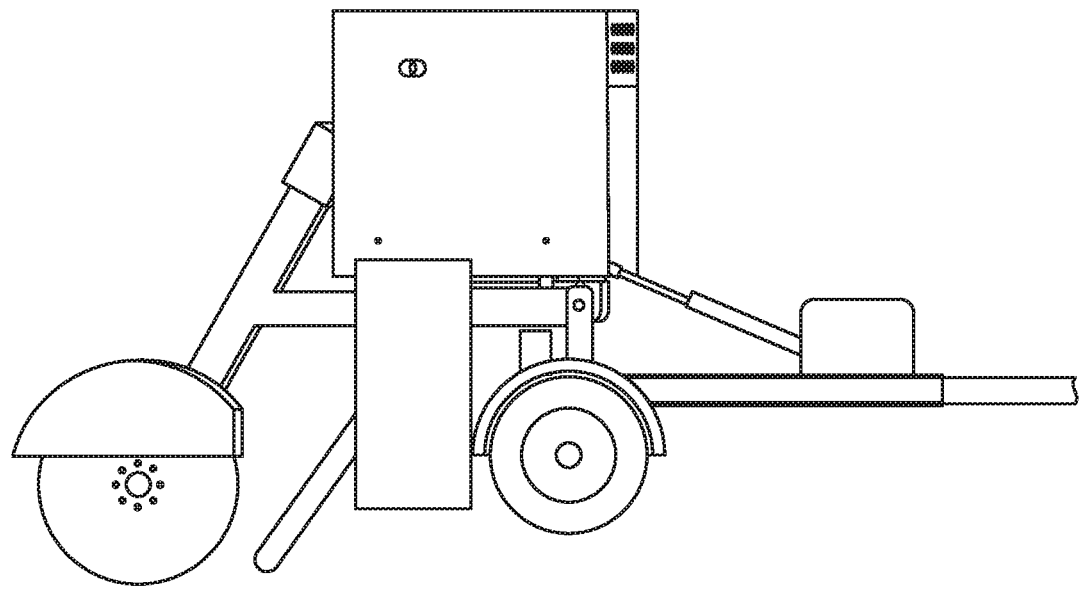

The primary chip pickup chute 12 can have radiused corners and edges so that it does not bite and get stuck into the ground (see FIG. 5). The primary chip pickup chute 12 can be concave so that it does not bite and get stuck into the ground, and to better redirect the chips to a desired target location (see FIG. 6). The primary chip pickup chute 12 can have two or more concave sections (26, 28) so that it does not bite and get stuck into the ground, and to better redirect the chips to a desired target location (see FIG. 7). A top secondary/tertiary redirecting chute 32 can be positioned above the primary chip pickup chute 12 and/or above the target area T (e.g., collection bin), to redirect cut chips exiting the second end 12b of the primary chip pickup chute 12 to the target area T (see FIG. 8).

Figure 3:
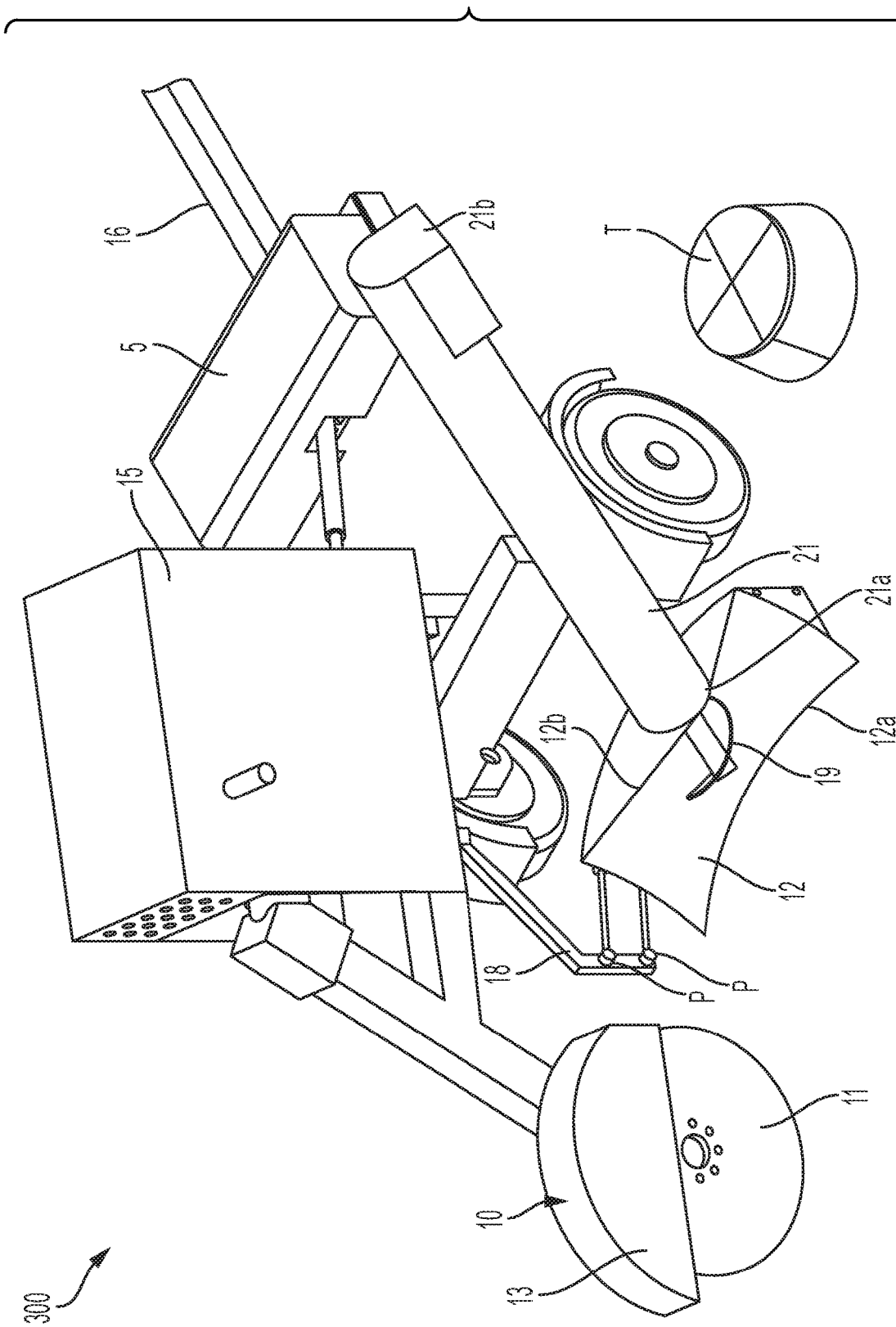
FIG. 3 is a schematic representation view of a stump grinder chip pickup chute collection system according to an embodiment.

Turning to FIG. 3, a schematic representation view of a stump grinder chip pickup chute collection system 300 is shown according to an embodiment. This embodiment is similar to the embodiment described with respect to system 100 above. The basic movements and functionality of the primary chip pickup chute 12 can be the same as discussed above with respect to system 100. A main difference includes the connection of a secondary pickup chute 21 to the second end 12b of the primary chip pickup chute 12. When the chips exit the second end 12b of the primary chip pickup chute 12, they can enter (or be funneled into via a more tapered/funnel shape, or can include a rigid or flexible top/sides or cover mechanism 30 that can extend from the guard 13 and/or wheel 11 to the sides and/or second end 12b of the primary chip pickup chute 12—see FIG. 4) the proximal end 21a of the secondary pickup chute 21. The chips can move through the secondary pickup chute 21 via the energy harnessed in the chips by the system 300 and/or can be assisted by another mechanism positioned on or inside the secondary pickup chute 21 including an auger 19 or other movement mechanism as described herein, from a proximal end 21a to a distal end 21b. Upon exiting the distal end 21b, the chips can exit to a target area "T." This target area can be another/secondary pickup chute, a particular collection bin, collection bag, conveyor belt or other target location.

FIGS. 9-12 show additional embodiments of stump grinder chip pickup chute collection systems with multiple chip pickup chutes.

Turning to FIG. 9A-D, schematic representation views of a stump grinder chip pickup chute collection system 400 are shown according to an embodiment. This embodiment is similar in some respects to the embodiment described with respect to system 100 above. A main difference includes the primary chip pickup chute 412, which is structured as a conveyor in this Figure, and is connected and fixed to the frame of the moveable machine 5 (although it could be configured to move as discussed above with respect to the other embodiments). The primary chip pickup chute 412 includes a proximal or first end 412a and a distal or second end 412b, and can include only a bottom surface, a bottom plus side surfaces, or a bottom plus side and top surfaces. The primary chip pickup chute 412 can have radiused corners and edges so that it does not bite and get stuck into the ground. The primary chip pickup chute 412 is configured to capture/control/redirect at least 50% or more of the cut chips from the distal/discharge/second end 412b of the primary chip pickup chute 412 to a target area "T1," which includes the proximal end 440a of a secondary chip pickup chute 440. The secondary chip pickup chute 440 can be structured as a conveyor in this Figure, and is connected and fixed to the frame of the moveable machine 5 (although it could be configured to move as discussed above with respect to the other embodiments). The secondary chip pickup chute 440 also includes a distal or second end 440b, and can include only a bottom surface, a bottom plus side surfaces, or a bottom plus side and top surfaces. The secondary chip pickup chute 440 can be configured to control/redirect at least 50% or more of the cut chips from the distal/discharge/second end 440b of the secondary chip pickup chute 440 to a target area "T2" on the left side of the machine, which can be another/secondary pickup chute, a particular collection bin, collection bag, conveyor belt or other target location.

Figure 10A:
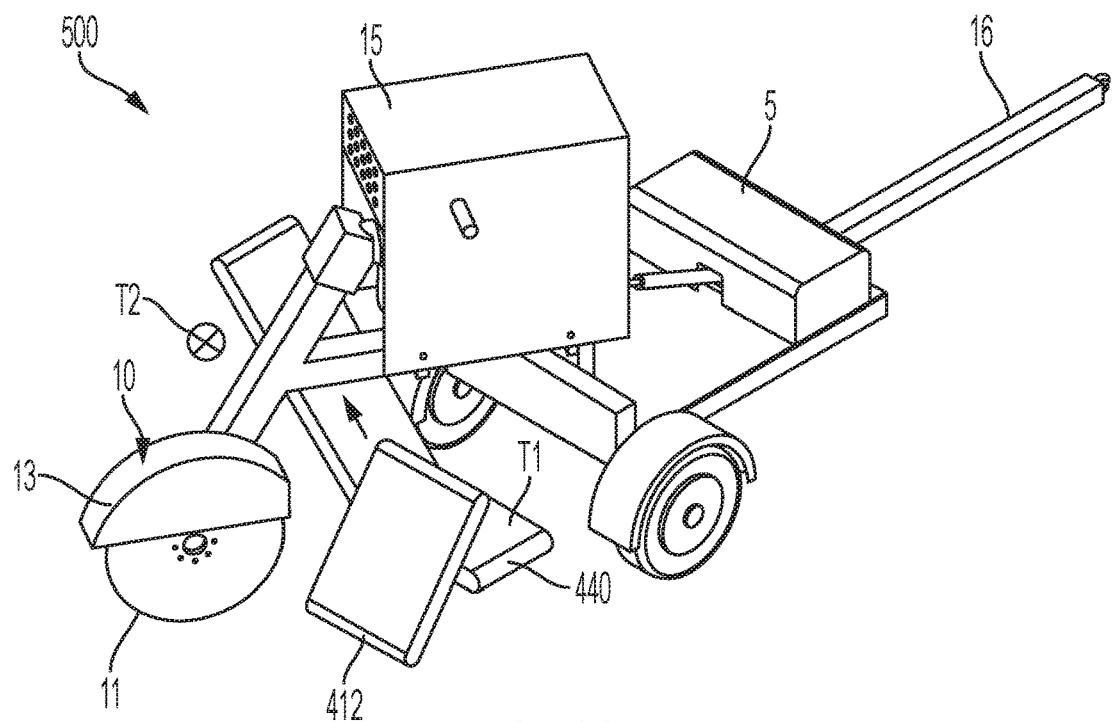
FIGS. 10A-C are various schematic representation views of a stump grinder chip pickup chute collection system according to an embodiment.
Figure 10B:
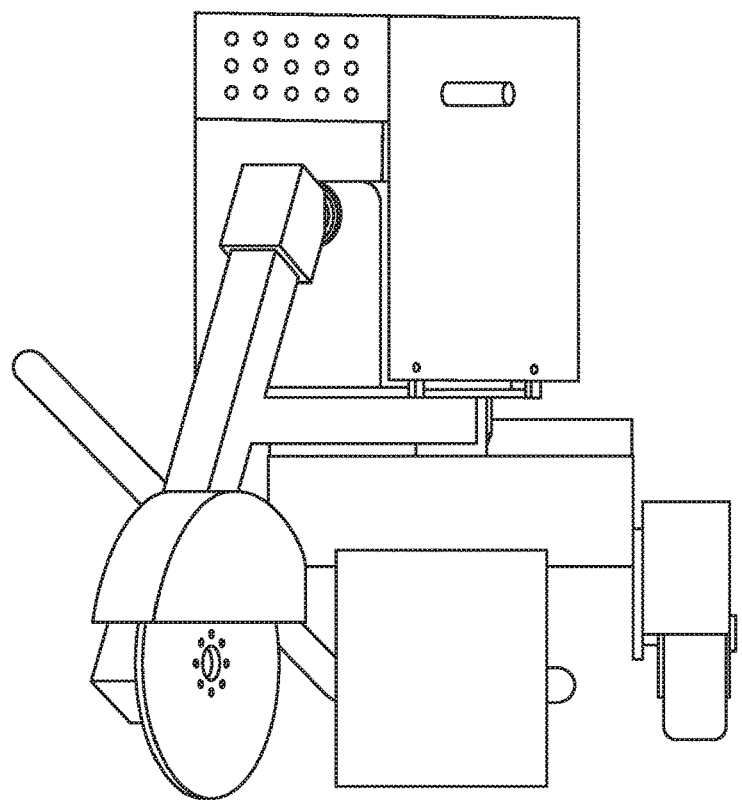
Figure 10C:
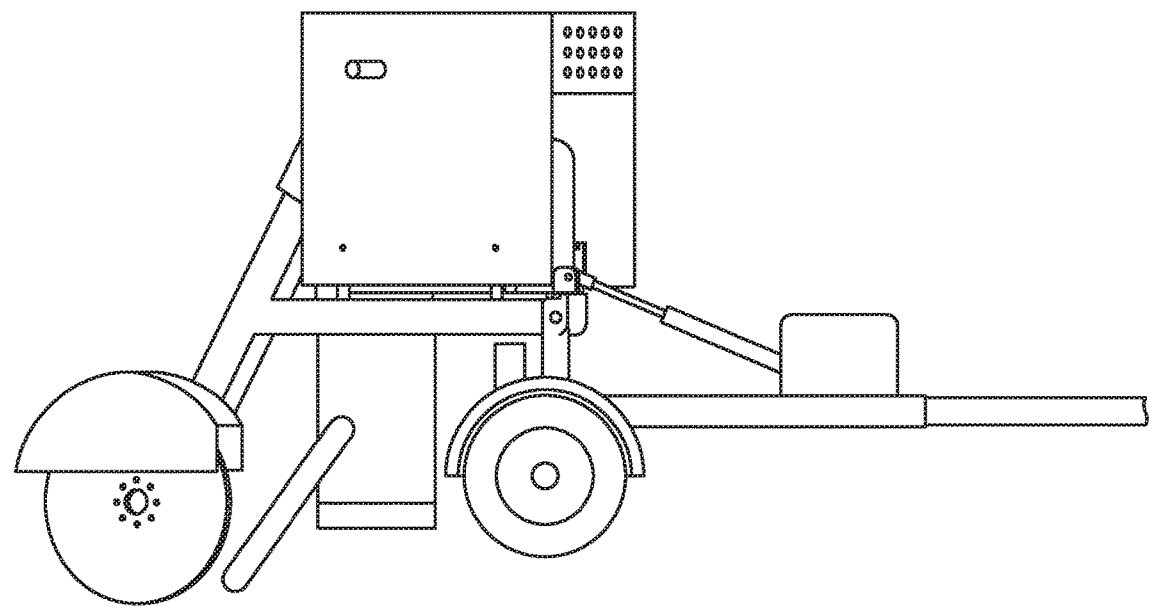

Turning to FIG. 10A-C, schematic representation views of a stump grinder chip pickup chute collection system 500 are shown according to an embodiment. This embodiment is similar in most respects to the embodiment described with respect to system 400 above. The main difference is that the secondary chip pickup chute 440 can be configured to control/redirect at least 50% or more of the cut chips from the distal/discharge/second end 440b of the secondary chip pickup chute 440 to a target area "T2" on the right side (as opposed to the left side) of the machine, which can be another/secondary pickup chute, a particular collection bin, collection bag, conveyor belt or other target location.

Figure 11A:
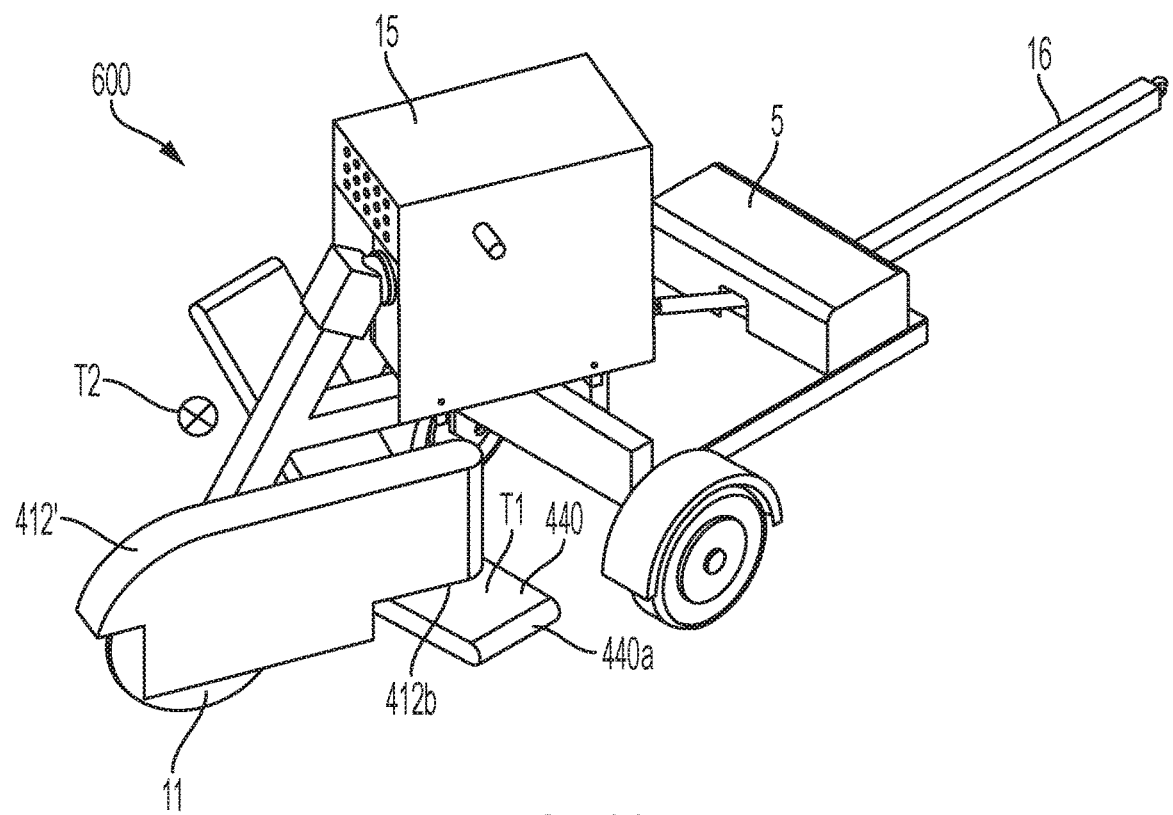
FIGS. 11A-C are various schematic representation views of a stump grinder chip pickup chute collection system according to an embodiment.
Figure 11B:
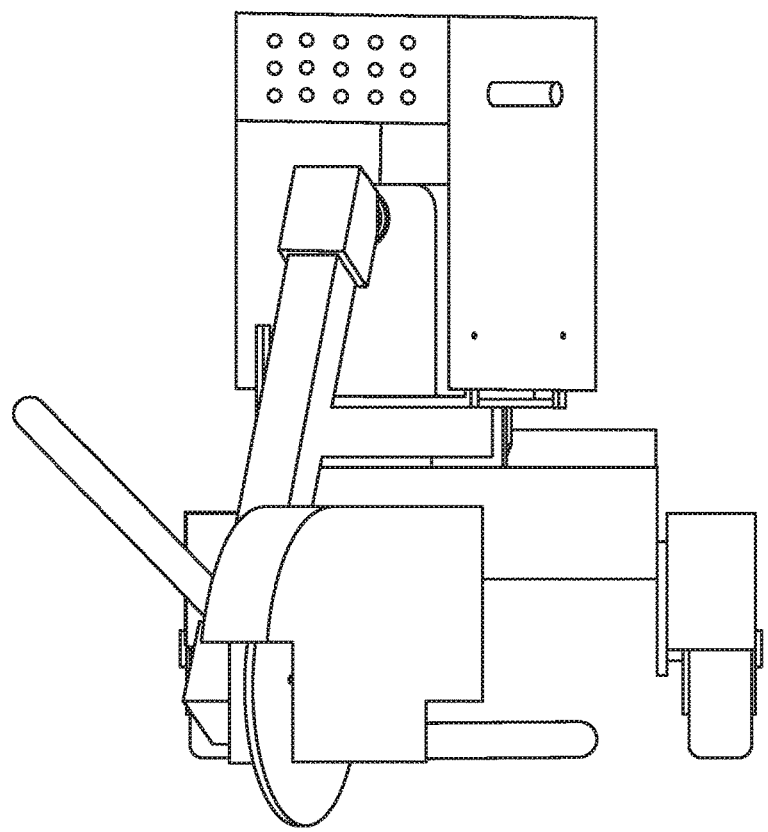
Figure 11C:
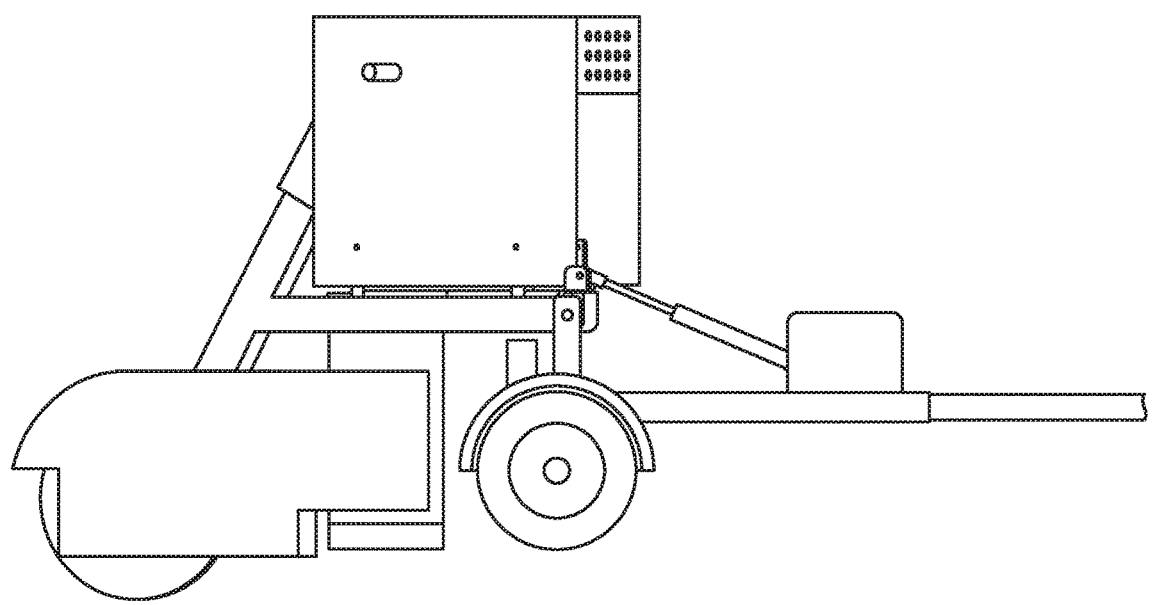

Turning to FIG. 11A-C, schematic representation views of a stump grinder chip pickup chute collection system 600 are shown according to an embodiment. This embodiment is similar in many respects to the embodiment described with respect to system 500 above. The main difference is that the primary chip pickup chute 412 is positioned and surrounds a majority of the top and side portions of the wheel 11, and extends behind the proximal portion of the wheel 11 to a position over the proximal end 440a of the secondary chip pickup chute 440. This configuration of the primary chip pickup chute 412 assists with the capture and collection of the cut chips from the wheel 11, creation of a seal and harnessing of the energy of the cut chips (as discussed above), and redirection of preferably over 50% of the cut chips from the distal/discharge/second end 412b to the target T1 on the proximal end 440a of the secondary chip pickup chute 440.

Figure 12A:
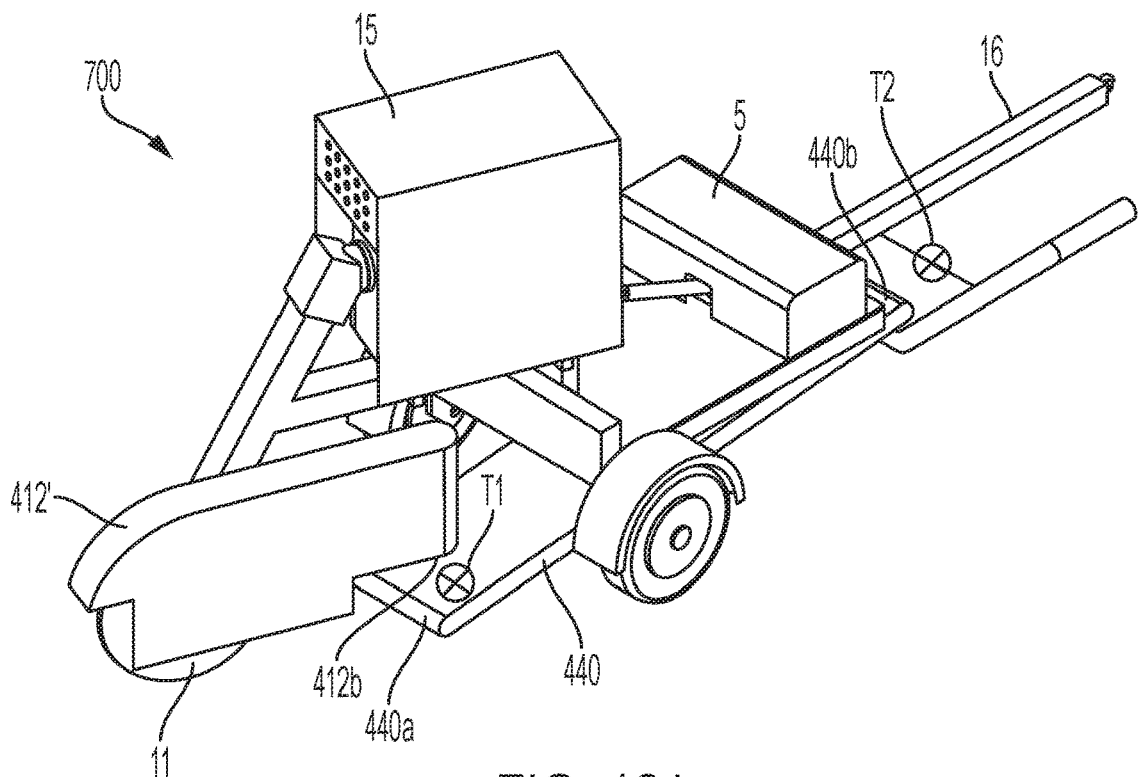
FIGS. 12A-C are various schematic representation views of a stump grinder chip pickup chute collection system according to an embodiment.
Figure 12B:
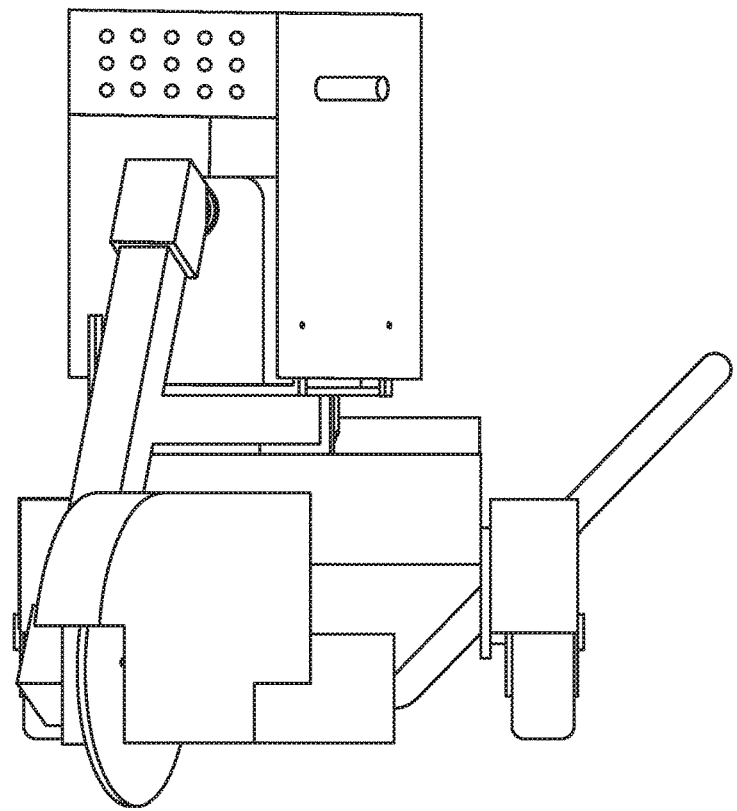
Figure 12C:
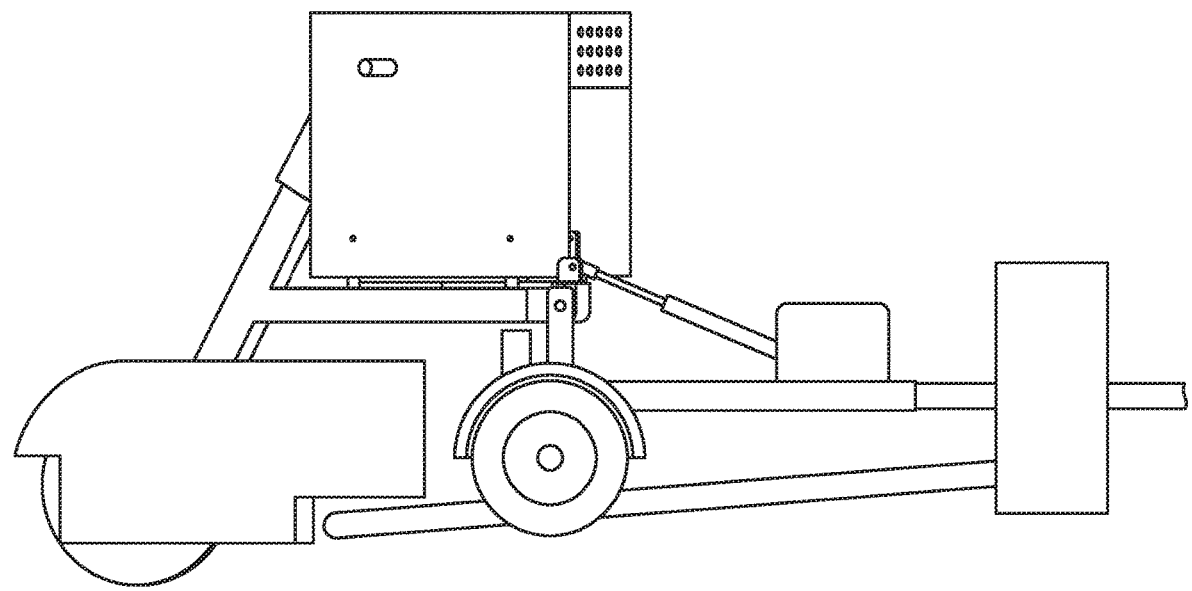

Turning to FIG. 12A-C, schematic representation views of a stump grinder chip pickup chute collection system 700 are shown according to an embodiment. This embodiment is similar in most respects to the embodiment described with respect to system 600 above. The main difference is that the secondary chip pickup chute 440 can be configured to control/redirect at least 50% or more of the cut chips from the distal/discharge/second end 440b of the secondary chip pickup chute 440 to a target area "T2" behind (as opposed to the right side of) the machine, which can be another/secondary pickup chute, a particular collection bin, collection bag, conveyor belt or other target location.

Figure 13A:
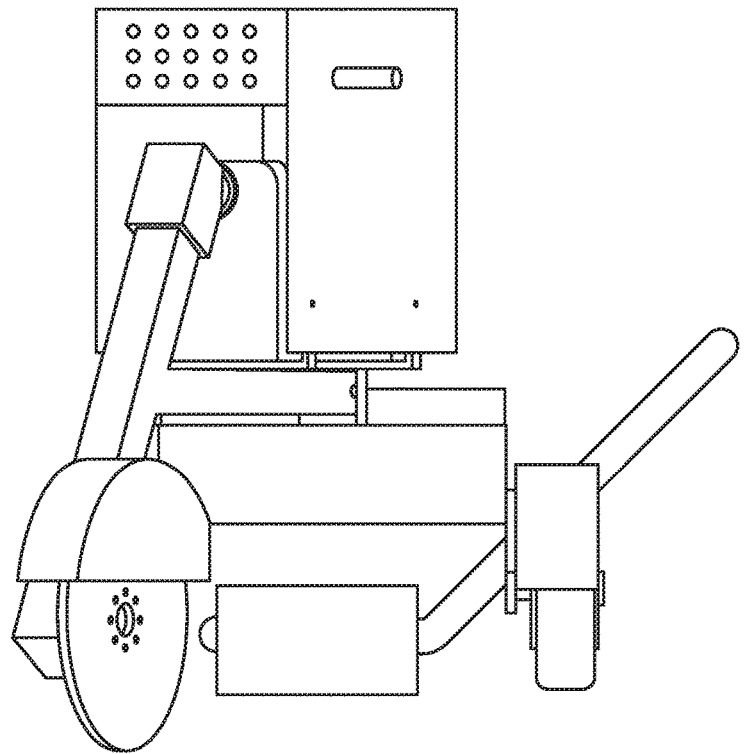
FIG. 13A-C are various schematic representation views of a stump grinder chip pickup chute collection system according to an embodiment.
Figure 13B:
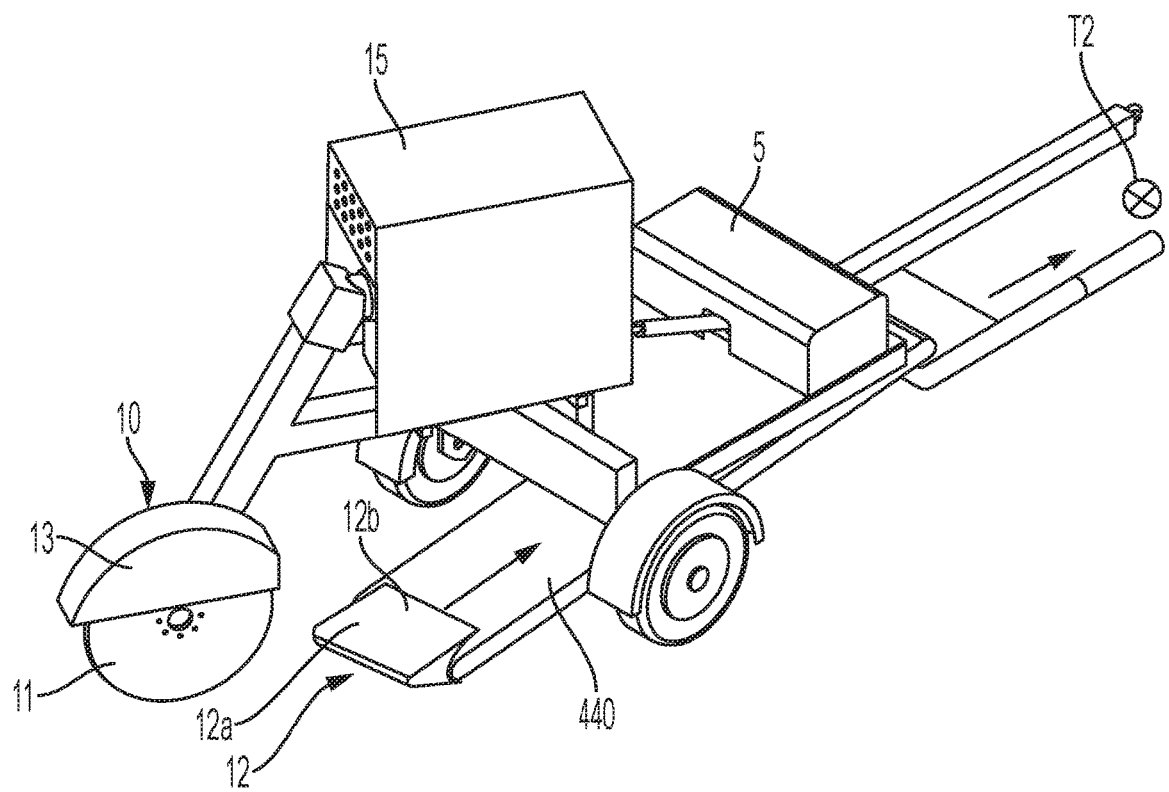
Figure 13C:
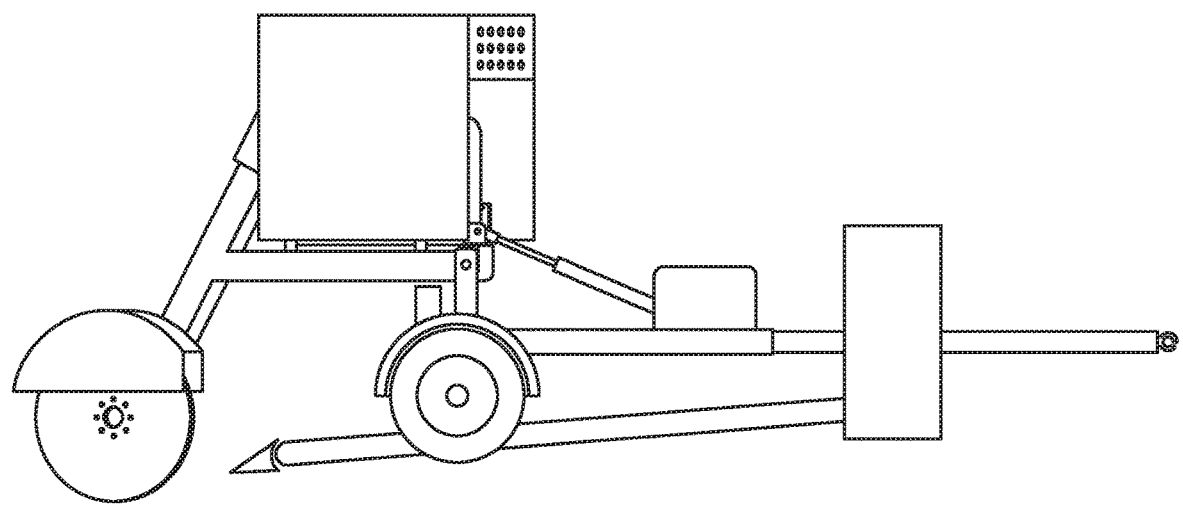

Turning to FIGS. 13A-C, various schematic representation views of a stump grinder chip pickup chute collection system 200 are shown according to an embodiment. This embodiment is similar in most respects to the embodiment described with respect to system 700 above. The main difference is that the primary chip pickup chute 12 is positioned at the proximal end of the secondary chip pickup chute 440 by a side plate or other connection.

All definitions, as defined and used herein, should be understood to control over dictionary definitions, definitions in documents incorporated by reference, and/or ordinary meanings of the defined terms.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:
1. A stump grinding machine, comprising:
   a chassis;
   a stump grinding wheel assembly comprising a stump grinding wheel including a central longitudinal axis positioned therethrough and connected to a first end of a first frame, wherein a second end of the first frame is connected to the chassis; and a chip pickup chute collection system comprising:

a primary chip pickup chute comprising a first surface positionable in spaced relation to the stump grinding wheel assembly and comprising a proximal chip receiving end and a distal chip discharge end;

wherein the primary chip pickup chute is connected to a first end of a second frame at a connection point and is movable about the connection point, wherein a second end of the second frame is connected to the chassis.

2. The stump grinding machine of claim 1, wherein the primary chip pickup chute is connected at the connection point to the first end of the second frame via a parallel linkage.

3. The stump grinding machine of claim 1, wherein the primary chip pickup chute is moveable within a first plane positioned a predetermined distance from the longitudinal axis when the wheel is facing a first direction.

4. The stump grinding machine of claim 1, wherein the primary chip pickup chute is moveable within a second plane that is configured to bring the primary chip pickup chute closer to or further away from the central longitudinal axis.

5. The stump grinding machine of claim 1, wherein the first surface includes a concave-shaped surface.

6. The stump grinding machine of claim 1, wherein the first surface includes multiple concave-shaped surfaces.

7. The stump grinding machine of claim 1, wherein the proximal chip receiving end of the primary chip pickup chute is positionable below a midpoint plane of the stump grinding wheel.

8. The stump grinding machine of claim 7, wherein the proximal chip receiving end of the primary chip pickup chute is positionable at least ¾ of a radius of the stump grinding wheel below a midpoint plane of the stump grinding wheel.

9. The stump grinding machine of claim 1, wherein the proximal chip receiving end of the primary chip pickup chute is positionable between 0 inches and 5 inches from a chip exiting a cut by the stump grinding wheel when in use.

10. The stump grinding machine of claim 1, wherein the primary chip pickup chute comprises a bottom having radiused corners.

11. The stump grinding machine of claim 1, further comprising a secondary chip pickup chute comprising a second surface positionable in spaced relation adjacent to the distal chip discharge end of the primary chip pickup chute.

12. The stump grinding machine of claim 11, wherein at least one of the primary chip pickup chute and the secondary chip pickup chute includes a movement mechanism.

13. The stump grinding machine of claim 11, wherein the movement mechanism includes one of a conveyor belt mechanism, a brush mechanism, a vacuum and an auger.

\* \* \* \* \*